United States Patent
Tunstall

(10) Patent No.: US 10,594,471 B2
(45) Date of Patent: Mar. 17, 2020

(54) MULTIPLICATIVE BLINDING FOR CRYPTOGRAPHIC OPERATIONS

(71) Applicant: Cryptography Research, Inc., Sunnyvale, CA (US)

(72) Inventor: Michael Tunstall, Walnut Creek, CA (US)

(73) Assignee: Cryptography Research, Inc., Sunnyvale, CA (US)

( * ) Notice: Subject to any disclaimer, the term of this patent is extended or adjusted under 35 U.S.C. 154(b) by 688 days.

(21) Appl. No.: 15/073,225

(22) Filed: Mar. 17, 2016

(65) Prior Publication Data

US 2016/0277179 A1 Sep. 22, 2016

Related U.S. Application Data

(60) Provisional application No. 62/136,377, filed on Mar. 20, 2015.

(51) Int. Cl.
| | |
|---|---|
| H04L 9/00 | (2006.01) |
| H04L 9/30 | (2006.01) |
| G06F 21/75 | (2013.01) |

(52) U.S. Cl.
CPC ............ *H04L 9/002* (2013.01); *G06F 21/755* (2017.08); *H04L 9/302* (2013.01)

(58) Field of Classification Search
CPC ... H04L 9/002; H04L 9/302; H04L 2209/046; G06F 21/75; G06F 21/755; G06F 2221/2123; G09C 1/00
See application file for complete search history.

(56) References Cited

U.S. PATENT DOCUMENTS

| | | | |
|---|---|---|---|
| 6,304,658 B1 | 10/2001 | Kocher et al. | |
| 7,177,423 B2 | 2/2007 | Antipa | |
| 8,738,927 B2 | 5/2014 | Hubert | |
| 2011/0216900 A1† | 9/2011 | Yoon et al. | |

FOREIGN PATENT DOCUMENTS

GB 0307197.4 * 3/2003

OTHER PUBLICATIONS

Ebeid, Nevine et al., "A New CRT-RSA Algorithm Resistant to Powerful Fault Attacks", Proceedings of the 5th Workshop on Embedded Security Systems, WESS 2010, Scottsdale, AZ, Oct. 24, 2010. 8 pages.

Granlund, Torbjorn et al., "Division by Invariant Integers using Multiplication", Proceedings of the SIGPLAN '94 Conference on Programming Language Design and Implementation, 1994, 12 pages.

Ha, JaeCheol et al., "A new CRT-RSA Scheme Resistant to Power Analysis and Fault Attacks", Third International Conference on Convergence and Hybrid Information Technology, Nov. 11-13, 2005, pp. 351-356. 6 pages.

(Continued)

*Primary Examiner* — Ayoub Alata
(74) *Attorney, Agent, or Firm* — Lowenstein Sandler LLP

(57) ABSTRACT

A value corresponding to an input for a cryptographic operation may be received. The value may blinded by multiplying the value based on an exponentiation of a random number raised to an exponent value that is associated with a public key. A cryptographic operation may be performed based on the blinded value.

19 Claims, 6 Drawing Sheets

(56) References Cited

OTHER PUBLICATIONS

Kim, Heeseok et al., "Message Blinding Method Requiring No Multiplicative Inversion for RSA", ACM Transactions on Embedded Computing Systems, vol. 13, No. 4, Article 80, pp. 80:1-80:10., Feb. 2014. 10 pages.

Kim, HeeSeok et al., "Practical Second-Order Correlation Power Analysis on the Message Blinding Method and Its Novel Countermeasure for RSA", ETRI Journal, vol. 32, No. 1, Feb. 2010, pp. 102-111. 10 pages.

Maitland, Greg, and Colin Boyd. "A provably secure restrictive partially blind signature scheme." International Workshop on Public Key Cryptography. Springer Berlin Heidelberg, 2002.†

\* cited by examiner
† cited by third party

US 10,594,471 B2

MULTIPLICATIVE BLINDING FOR CRYPTOGRAPHIC OPERATIONS

RELATED APPLICATION

This application claims the benefit under 35 U.S.C. § 119(e) of U.S. Provisional Application 62/136,377 filed on Mar. 20, 2015, which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
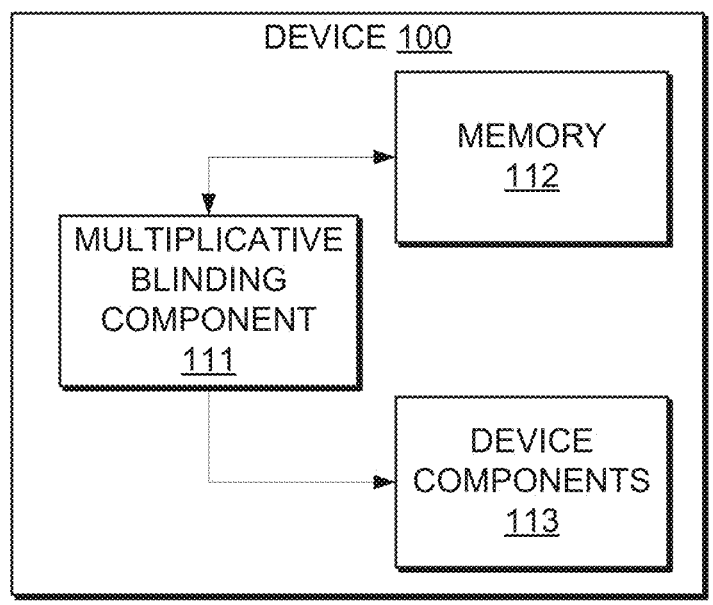
FIG. 1 illustrates an example device using a multiplicative blinding component for cryptographic operations in accordance with some embodiments.

Aspects of the present disclosure are directed to multiplicative blinding for cryptographic operations. An integrated circuit may perform a cryptographic operation that may result in susceptibility of the integrated circuit to a side channel attack where an attacker of the integrated circuit may obtain information as the cryptographic operation is performed. An example of a side channel attack includes, but is not limited to, Differential Power Analysis (DPA) where the attacker who seeks to obtain a secret key or other input used in a cryptographic operation may study the differences in power consumption of the integrated circuit as the cryptographic operation is performed. An attacker may be an unauthorized entity that may obtain the input to the cryptographic operation by analyzing power consumption measurements of the integrated circuit over a period of time.

An attacker may also seek to determine a secret key or other input used in a cryptographic operation by injecting a fault in a microprocessor or integrated circuit as the cryptographic operation is performed. A fault injection may refer to a condition that impacts the operation of the integrated circuit. For example, the fault injection may maliciously change the operation of the integrated circuit. Examples of a fault injection include, but are not limited to, a change in the environmental condition of the integrated circuit. Such changes in the environmental condition may be associated with a change in power supply levels, exposure of the integrated circuit to high temperatures, electromagnetic disturbances, or other such environmental conditions that may impact the operation of the integrated circuit. An attacker may compare the faulty result based on the injected fault (e.g., the result of the cryptographic operation when the environment condition has been applied to the integrated circuit while performing the cryptographic operation) with a correct result that is obtained using the same input without injecting the fault to attempt to derive a secret key or other input used in the cryptographic operation. The attacker may be an unauthorized entity that may obtain the input to the cryptographic operation by analyzing pairs of faulty results and correct results from the integrated circuit.

Thus, when a sender transmits a ciphertext to a receiver by encoding plaintext via a cryptographic operation, the attacker may be able to retrieve the secret key (e.g., the input used in the cryptographic operation) that is used to encrypt the plaintext to the ciphertext by observing the power consumption of the integrated circuit as the cryptographic operation is performed to encode a plaintext into a ciphertext. Likewise, an attacker may also be able to retrieve the secret key that is used to encrypt the plaintext to the ciphertext by injecting faults into the integrated circuit. For example, the attacker may uncover a cryptographic (e.g., secret or private) key that is used to encrypt the plaintext or that is used to generate a cryptographic signature as the cryptographic operation is performed by the integrated circuit.

Multiplicative blinding may be used to obfuscate or hide the input to the cryptographic operation by multiplying the input with random data to generate a blinded input and performing an exponentiation using the blinded input. Such multiplicative blinding may result in the attacker of an integrated circuit observing power consumption measurements through a side channel attack not being able to derive the actual inputs that are used in the cryptographic operation. For example, the side channel attack may depend on the attacker of the integrated circuit knowing characteristics of the cryptographic operation as well as one or more inputs to the cryptographic operation. However, blinding the input to the cryptographic operation may alter the characteristics of the cryptographic operation to include unpredictable or random states that may prevent leakage of useful information that may be used by the attacker to recreate the inputs that were used in the cryptographic operation. For example, the intermediate states of the cryptographic operation may be indistinguishable from random data when the attacker of the integrated circuit observes the power consumption of the integrated circuit as the cryptographic operation is performed with the blinded input.

Such multiplicative blinding may also result in the attacker of an integrated circuit injecting faults but not being able to derive the actual inputs that are used in the cryptographic operation. For example, a fault attack may depend on the attacker of the integrated circuit knowing characteristics of the cryptographic operation as well as one or more inputs to the cryptographic operation. However, blinding the input to the cryptographic operation may alter the characteristics of the cryptographic operation to include unpredictable or random states that may hide or obfuscate particular information from being present in a faulty ciphertext. For example, the result may be a multiple of a particular number, which may be invalidated by the proposed blinding.

Multiplicative blinding may be performed for a cryptographic operation such as, but not limited to, an RSA cryptographic operation. An RSA cryptographic operation may involve a public key and a private key. The public key may include a first value that is used as an exponent value in an exponentiation operation and a second value that is that is used as a modulus value. The private key may include the modulus value as well as another value that is used as an exponent value in another exponentiation operation. Such values may be considered inputs to the RSA cryptographic operation when encrypting data and/or when generating a signature.

Accordingly, multiplicative blinding for an RSA cryptographic operation may involve multiplying inputs (e.g., the private and/or public exponent values) with a randomly generated number and by the performing of exponentiation operations. The use of the multiplicative blinding for the input to an RSA cryptographic operation may prevent DPA leakage associated with the RSA cryptographic operation as it is being performed by an integrated circuit so that an attacker may not be able to retrieve the private key exponent value. The use of the multiplicative blinding for the input to an RSA cryptographic operation may also prevent fault attacks.

FIG. 1 illustrates an example device including a multiplicative blinding component. In general, the device 100 may include an integrated circuit that is associated with a multiplicative blinding component 111, a memory 112, and various device components 113. The multiplicative blinding component 111 of the integrated circuit may perform operations to blind an input (e.g., a public key exponent value, private key exponent value, etc.) for use in a cryptographic operation (e.g., an RSA cryptographic operation) performed by the device components 113.

As shown in FIG. 1, the device 100 may include a multiplicative blinding component 111 that may perform operations to blind the input or portions of the input. For example, the multiplicative blinding component 111 may receive an input (e.g., from the memory 112) and may multiply the input with a random number as well as perform an exponentiation. The device components 113 may subsequently use the results of the multiplicative blinding component 111 in a cryptographic operation. Examples of such cryptographic operations include, but are not limited to, generating a signature for a message where the message may be used to allow access to particular functionality of the device 100 to allow the device 100 to perform a particular operation or to encrypt data. Accordingly, the multiplicative blinding component 111 may modify the input to generate a blinded input to the device components 113 or the multiplicative blinding component 111 may perform a cryptographic operation based on the blinded input. Furthermore, a component of the device components 113 may perform a cryptographic operation based on the blinded input to generate a signature for a message or other information that may be used to determine whether a sender of the message corresponding to the signature may be allowed to access functionality of the device 100 (e.g., various device components 113) or whether the device 100 may be allowed to perform an operation in response to the message.

Examples of the functionality or operations associated with a device include, but are not limited to, access of certain hardware capabilities of the device (e.g., enable or disable certain hardware capabilities of the device 100), access to debug or diagnostic states of the device, and the writing to a memory associated with the device, adjust performance settings or other values of the device 100, encrypt keys for use by the device 100, modify the memory 112 of the device 100, etc.

The sender of a message may be allowed to access the functionality or operations of the device 100 when the message from the sender is accompanied by a valid signature that is generated by a cryptographic operation. Examples of such cryptographic operations include, but are not limited to, generating a signature associated with an RSA cryptosystem or to encrypt and/or decrypt data associated with an RSA cryptosystem. In some embodiments, the cryptographic operation may use the blinded input to generate the signature. The blinded input may correspond to a portion of the input (e.g., at least one input value is blinded and at least one other input value is not blinded) or the blinded input may correspond to each input (e.g., all of the input values are blinded).

Figure 2:
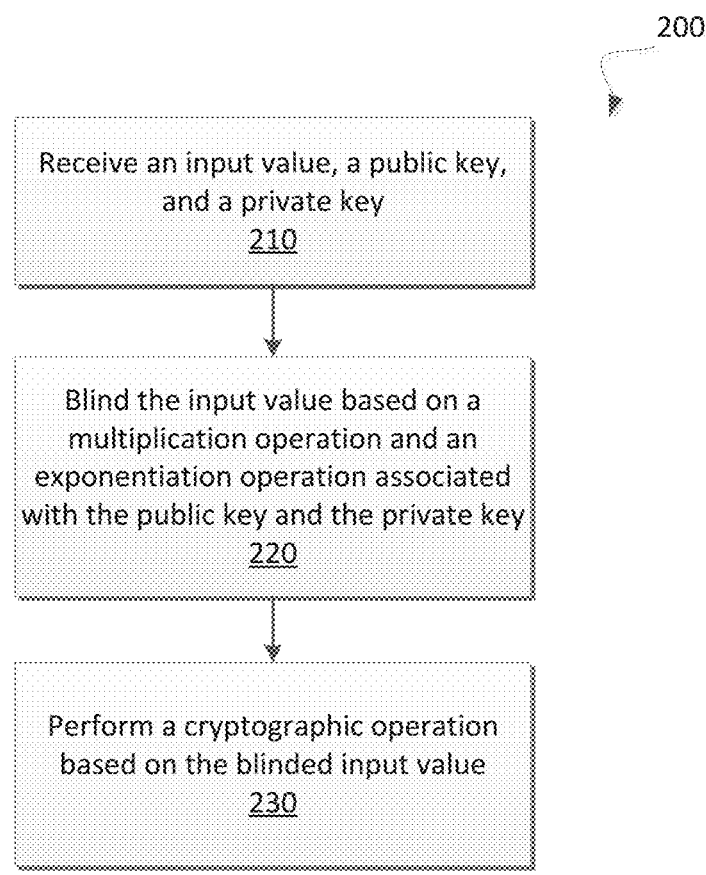
FIG. 2 is a flow diagram of an example method to perform multiplicative blinding for cryptographic operations in accordance with some embodiments of the present disclosure.

FIG. 2 is a flow diagram of an example method 200 to perform multiplicative blinding for cryptographic operations. In general, the method 200 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the multiplicative blinding component 111 of FIG. 1.

As shown in FIG. 2, the method 200 may begin with the processing logic receiving a public key, a private key, and an input value (block 210). For example, a value for a public key exponent value and a modulus value may be received as portions of a public key. Furthermore, a private key exponent value may be received as a portion of the private key. The input value may be an input to an RSA cryptographic function (e.g., a message). The processing logic may further blind the input value by performing computations that are based on a multiplication operation and an exponentiation operation that are associated with the public key and the private key (block 220). The random number may be randomly generated by an integrated circuit. In some embodiments, the random number may be generated by software or a combination of hardware (e.g., the integrated circuit) and software. The exponentiation operation may be based on the random number and the portions of the public key and/or private key. For example, the computations may multiply the input value with the result of an exponentiation function that raises the random number to an exponent value that is based on a portion of the public key (e.g., the public key exponent value). A modulus operation based on another portion of the public key (e.g., the modulus value) may also be multiplied to the result of the random number that is raised to a value that is based on the exponent value. Further details with regards to multiplying the input value with a random number and based on at least one exponentiation operation are disclosed in conjunction with FIGS. 3-5. The processing logic may further perform cryptographic operations based on the blinded input value (block 230). For example, the blinded input values may be used in an RSA cryptographic operation.

Figure 3:
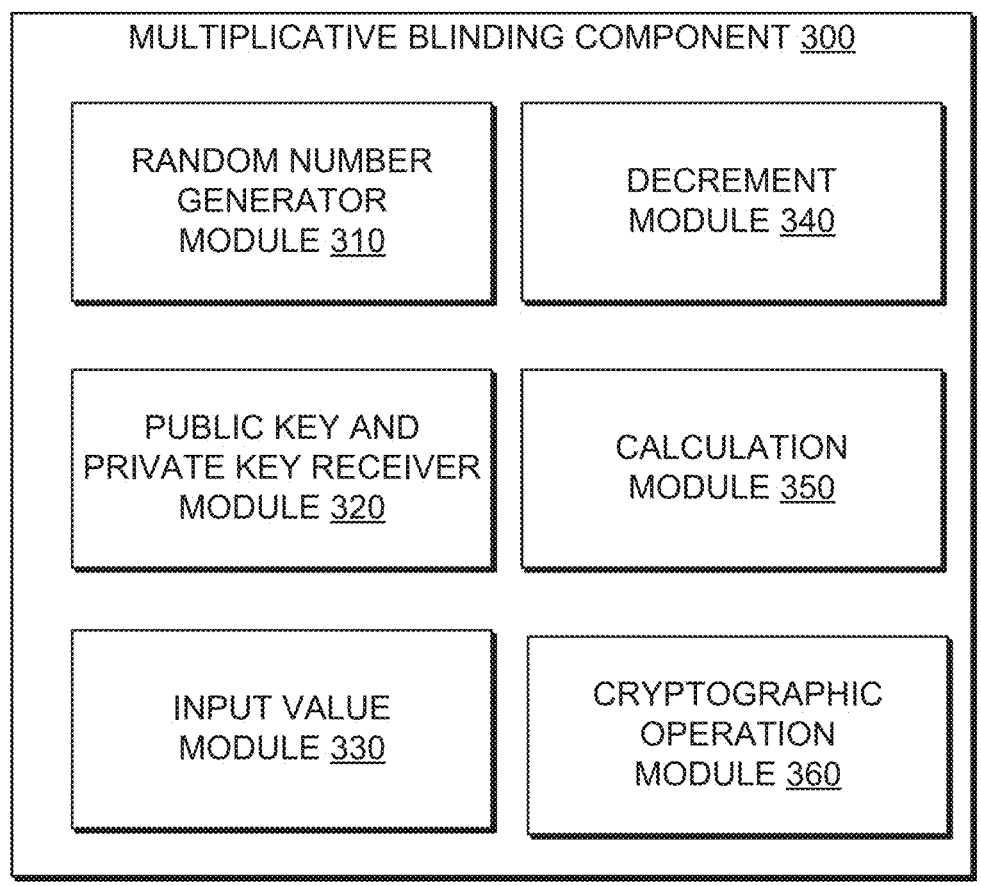
FIG. 3 is a block diagram of a multiplicative blinding component to provide multiplicative blinding for cryptographic operations in accordance with some embodiments.

FIG. 3 is a block diagram of a multiplicative blinding component 300 to provide multiplicative blinding for cryptographic operations. In general, the multiplicative blinding component 300 may correspond to the multiplicative blinding component 111 of FIG. 1. The multiplicative blinding component 300 may be implemented by or in processing logic that may comprise hardware (e.g., processing device, circuitry, dedicated logic, programmable logic, microcode, integrated circuit, hardware of a device, etc.), software (e.g., instructions run or executed on a processing device), or a combination thereof. In some embodiments, the multiplicative blinding component 300 may include a random number generator module 310, a public key and private key receiver module 320, an input value module 330, a decrement module 340, a calculation module 350, and a cryptographic operation module 360. In alternative embodiments, the functionality of one or more of the sub-modules may be combined or divided.

As shown in FIG. 3, the multiplicative blinding component 300 may include a random number generator module 310 that may randomly generate a random number. For example, the random number may be generated for each input value that is to be blinded with another value (e.g., via multiplicative blinding). The random number may be randomly generated for each input value that is to be blinded so that the random number may be different for each input value. The public key and private key receiver module 320 may retrieve values corresponding to a public key and a private key. For example, the public key may include a public key exponent value and a modulus value and the private key may include a private key exponent value. The values corresponding to the public key and the private key may be retrieved from a memory of an integrated circuit. The multiplicative blinding component 300 may include an input value module 330 that may receive an input value that is to be multiplicatively blinded. For example, the input value may be an input to a cryptographic operation (e.g., an RSA cryptographic operation) that will be multiplied by another value that is based on an exponentiation operation and a modulus operation before being used by the cryptographic operation to produce an output value.

The multiplicative blinding component 300 may include a decrement module 340 that may be used to decrement a value. For example, the decrement module 340 may decrement (e.g., by a value of 1) the public key exponent value and the private key exponent value so that the decremented public key exponent value and the decremented private key exponent value may be used in the operations to multiplicatively blind the input value. The calculation module 350 may perform operations based on the decremented values, exponentiation operations, and multiplication operations to generate a blinded input value. Further details with regards to such operations are disclosed in conjunction with FIGS. 4-5. The cryptographic operation module 360 may perform a cryptographic operation based on the blinded input value. For example, an RSA cryptographic operation may be used with the blinded input value to generate a signature for a message (e.g., to access a functionality or operation of an integrated circuit) or to encrypt and/or decrypt data.

Figure 4:
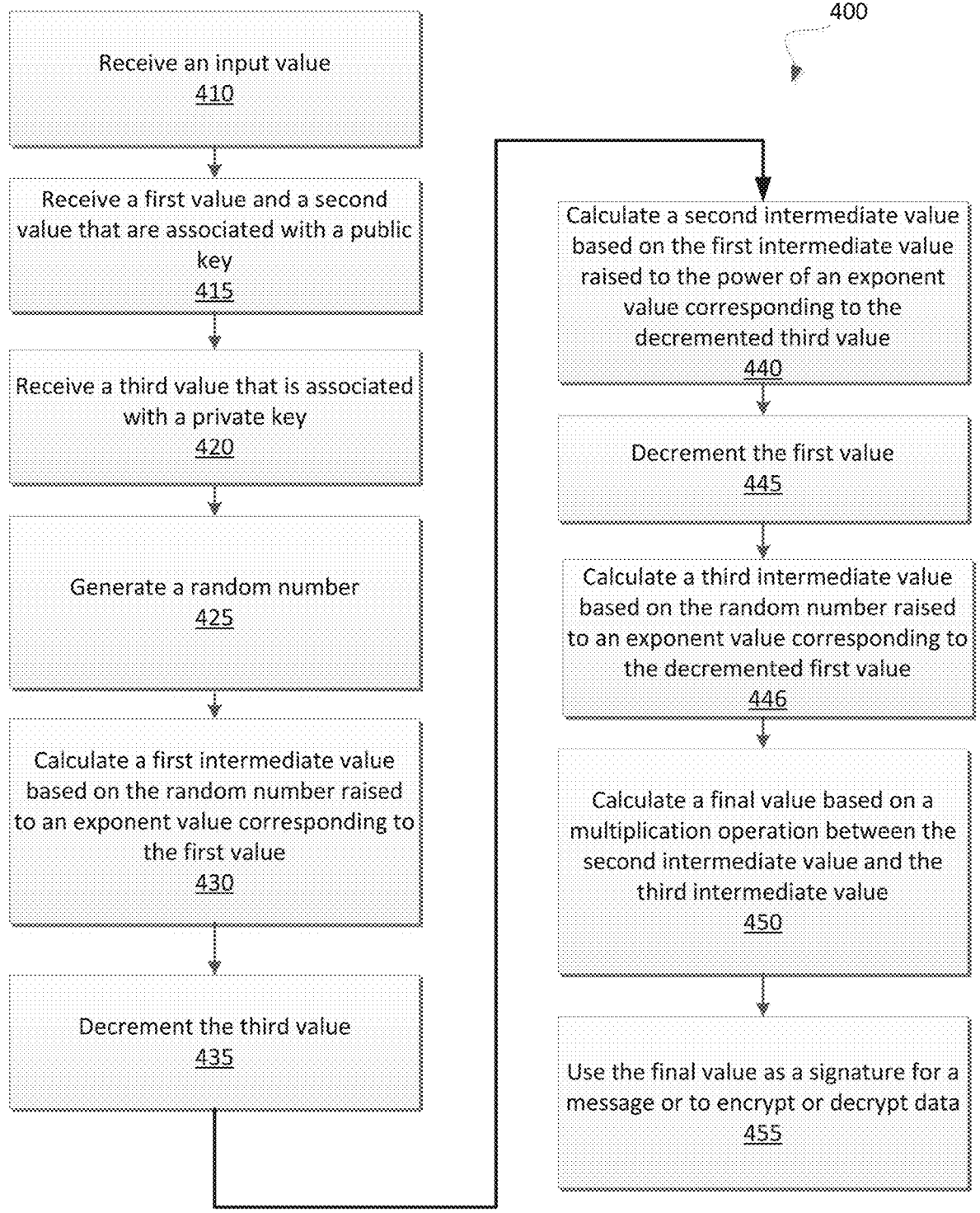
FIG. 4 is a flow diagram of an example method to perform multiplicative blinding for one or more inputs to a cryptographic operation in accordance with some embodiments.

FIG. 4 is a flow diagram of an example method 400 to perform multiplicative blinding for one or more inputs to a cryptographic operation. In general, the method 400 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the multiplicative blinding component 111 or 300 of FIG. 1 or 3.

The method 400 may be used to multiplicatively blind an input value to an RSA cryptographic operation so that the private key exponent value used in the RSA cryptographic operation may not be retrieved by an attacker via a side channel attack or fault attack. The multiplicatively blinded input may be used to further protect modular exponentiation operations from a similar side channel attack or fault attack from an attacker. In some embodiments, the RSA cryptographic operation may correspond to generating a signature or to encrypt and/or decrypt data so that the generating of the signature or the encrypting or decrypting of data may not expose the private key exponent value to the attacker via an attack. In some embodiments, in order to recover the original input value from the multiplicatively blinded input, an inversion operation (e.g., multiplying a value based on the inverse of another value) may not be required.

In some embodiments, the method 400 may perform multiplicative blinding in an RSA cryptographic operation based on the following series of operations:

$r \stackrel{R}{\leftarrow} \{1, \ldots 2^k-1\};$
$m_1 \leftarrow r^e \ m \ mod \ n;$
$m_2 \leftarrow m_1^{d-1} \ m \ mod \ n;$
$m_3 \leftarrow r^{e-1} \ m \ mod \ n;$
$s \leftarrow m_2 \ m_3 \ mod \ n;$ The notation $\stackrel{R}{\leftarrow}$ may denote a random assignment of an element of the set of numbers on the right-hand side (e.g., 1 to $2^k-1$). In some embodiments, r may refer to a randomly generated number. The randomly generated number r may have a bit length of k where k may be chosen as a security parameter. For example, r may be a randomly generated number between the values of one and $2^{32}-1$, or have a larger maximum if a higher security level is required. Thus, the value of k may vary based on a desired security level. Furthermore, n may be based on a multiplication operation based on two prime numbers p and q that are associated with an RSA cryptographic operation. The value n may be referred to as a modulus value. Additionally, e may represent the public key exponent value and d may represent the private key exponent value. Furthermore, in may represent an input value (e.g., an input message or the input value) that is to be used in the RSA cryptographic operation. The values $m_1$, $m_2$, and $m_3$ may represent a first, second, and third intermediate value respectively and s may represent the output value. In some embodiments, the operations as described above may perform a calculation where the result is multiplied by $r^{ed-1}$ which may be based on a value of 1 mod n that results a value of one. The multiplication of a value with the calculation of $r^{ed-1}$ that results in a value of one may be performed by an integrated circuit without changing the value of another value since the multiplication operation is with a calculation that results in a value of one.

As shown in FIG. 4, the method 400 may begin by the processing logic receiving an input value (e.g., in) (block 410). For example, a message that is to be multiplicatively blinded and used in an RSA cryptographic operation may be received. The processing logic may further receive a first value (e.g., the public key exponent value e) and a second value (e.g., the modulus value n) that are associated with a public key (block 415). The processing logic may further receive a third value (e.g., the private key exponent value d) that is associated with a private key (block 420). The public key and the private key may be mathematically linked. For example, the public key may be used to encrypt plaintext to ciphertext and the private key may be used to decrypt the ciphertext to plaintext. Similarly, the public key may be used to verify a signature and the private key may be used to create a signature. Thus, the private key may be considered an inverse of the public key. Furthermore, the processing logic may generate a random number (e.g., r) (block 425). For example, an integrated circuit may randomly generate a random number in response to receiving the input value that is to be used in the RSA cryptographic operation. The processing logic may further calculate a first intermediate value (e.g., $m_1$) based on the random number that has been raised to an exponent value that corresponds to the first value from the public key (e.g., $r^e$) and the input value modulo the second value from the public key (e.g., m mod n) (block 430). For example, the random number that is raised to the public key exponent value may be multiplied by a value corresponding to m mod n. Thus, the first intermediate value may be based on the public key exponent value. The processing logic may further decrement the third value (e.g., the private key exponent value d) (block 435). The decrementing of the private key exponent value may result in the decrementing by a value of one (e.g., d−1). The processing logic may subsequently calculate a second intermediate value (e.g., $m_2$) based on the first intermediate value (e.g., $m_1$) that is raised to the power of an exponent value corresponding to the decremented third value (e.g., $m_2 = m_1^{d-1}$ m mod n) (block 440). Thus, the second intermediate value may be based on the first intermediate value and a decremented private key exponent value. The processing logic may decrement the first value (e.g., e−1) (block 445). For example, the value of the public key exponent value may be decreased by a value of one. The processing logic may further calculate a third intermediate value (e.g., $m_3$) based on the random number raised to an exponent value corresponding to the decremented first value (e.g., $r^{e-1}$) (block 446). For example, the third intermediate value may be based on performing an exponentiation operation with the random number raised to an exponent value of the decremented public key exponent value. Subsequently, the processing logic may calculate a final value (e.g., s) based on a multiplication operation between the second intermediate value (e.g., $m_2$) and the third intermediate value (e.g., $m_3$) (block 450). The processing logic may use the final value (e.g., s) as a signature for a message or to encrypt or decrypt data (block 455).

As such, a message to be used in an RSA cryptographic operation may be received. A public key exponent value, a private key exponent value, and a modulus value may be received. The message may be used and multiplicatively blinded in an RSA cryptographic operation based on a series of operations that are associated with a random number, an exponentiation operation based on the public key exponent value, an exponentiation operation based on a decremented public key exponent value, an exponentiation operation based on a decremented private key exponent value, and the modulus value.

Figure 5:
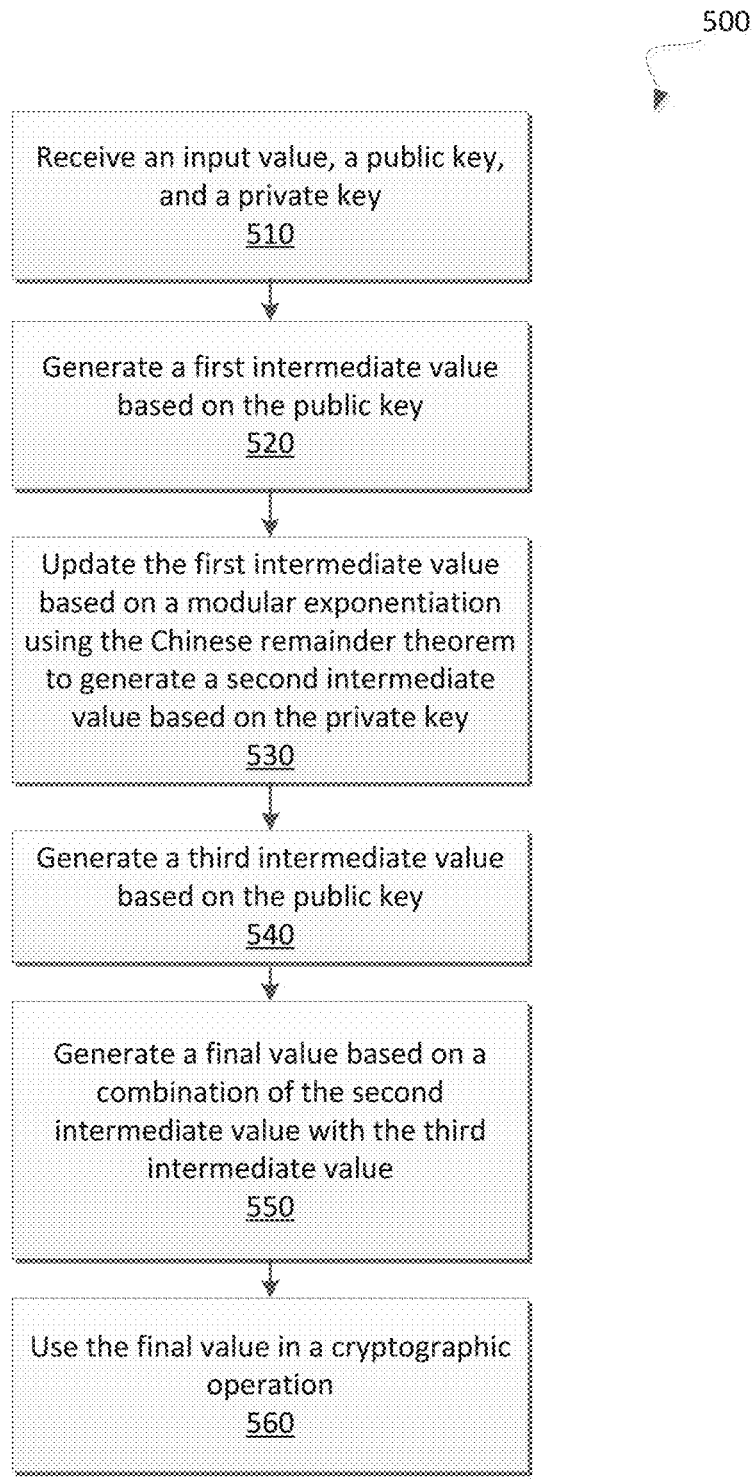
FIG. 5 is a flow diagram of an example method to perform multiplicative blinding for one or more inputs to a cryptographic operation based on the Chinese Remainder Theorem in accordance with some embodiments.

FIG. 5 is a flow diagram of an example method 500 to perform multiplicative blinding for one or more inputs to a cryptographic operation based on the Chinese remainder theorem. In general, the method 500 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the multiplicative blinding component 111 or 300 of FIG. 1 or 3.

The method 500 may be used to multiplicatively blind an input value to an RSA cryptographic operation and to generate a final value used as a signature or a final value to encrypt or decrypt data. The multiplicative blinding and use of the input value in an RSA cryptographic operation may use a modular exponentiation operation. In some embodiments, the modular exponentiation operation may be based on the Chinese remainder theorem that does not use an inversion operation.

As shown in FIG. 5, the method 500 may begin with the processing logic receiving an input value, a public key, and a private key (block 510). For example, the input value may be an input to be used in an RSA cryptographic operation (e.g., in). The public key may include the public key exponent value (e.g., e) and the modulus value (e.g., n) and the private key may include the private key exponent value (e.g. d). The processing logic may further generate a first intermediate value based on the public key. For example, the first intermediate value (e.g., $m_1$) may be generated as described above with regard to block 430 of FIG. 4. Furthermore, the processing logic may update the first intermediate value based on a modular exponentiation using the Chinese remainder theorem to generate a second intermediate value that is based on the private key (block 530). In some embodiments, the modular exponentiation that is based on the Chinese remainder theorem may include, but is not limited to, the following series of operations:

$r \xleftarrow{R} \{1, \ldots 2^k-1\}$;
$p' \leftarrow r\,p$;
$q' \leftarrow r\,q$;
$iq' \leftarrow p' + iq$;
$dp' \leftarrow p' - r + dp$;
$t \xleftarrow{R} \{1, \ldots 2^l-1\}$;
$m' \leftarrow tp' + m \bmod p'$;
$m_{rp} \leftarrow m' \bmod p'$;
$t \xleftarrow{R} \{1, \ldots 2^l-1\}$;
$m' \leftarrow tq' + m \bmod q'$;
$m_{rq} \leftarrow m' \bmod q'$;
$c_1 \leftarrow m_{rp}^{dp'} \bmod q'$;
$c_2 \leftarrow m_{rq}^{dq'} \bmod q'$;
$c_1 \leftarrow rc_1 \bmod p'$;
$c_2 \leftarrow rc_2 \bmod q'$;
$h \leftarrow iq'(c_1 - c_2) \bmod p'$;
$h \leftarrow hq' + rc_2$;
$s \leftarrow h/(r^2)$ In some embodiments, q and p may refer to prime numbers used in an RSA cryptographic operation. The value r may be a randomly generated number of bit length k, where k may be a security parameter (e.g., the bit length of a computer word). In some embodiments, the value r used in conjunction with FIG. 5 is a different randomly generated number than the value r used in conjunction with FIG. 4. Furthermore, the value dp may be equal to d mod (p−1) where d is the private key exponent value. The value dq may be equal to d mod (q−1) and the value iq may be equal to $q^{-1}$ mod p. The value t may be a randomly generated number of bit length l, where l may also be a security parameter. Furthermore, in may refer to an input value to be used in the RSA cryptographic operation.

In some embodiments, the Chinese remainder theorem may determine a number that, when divided by some given divisors, leaves given remainders. The Chinese remainder theorem as described above may be used to calculate a second intermediate value as described in conjunction with block 440 in FIG. 4. As such, the Chinese remainder theorem may be used to perform modular exponentiation operations (e.g., a type of exponentiation operation performed over a modulus).

Referring to FIG. 5, the method 500 may further generate a third intermediate value based on the public key (block 540). For example, the third intermediate value (e.g., $m_3$) may be generated as described above with regard to block 446 of FIG. 4. The processing logic may generate a final value based on a combination of the second intermediate value with the third intermediate value (block 550). For example, the final value (e.g., s) may be generated based on a multiplication operation between the second intermediate (e.g., $m_2$) and the third intermediate value (e.g., $m_3$). Furthermore, the processing logic may use the final value in a cryptographic operation (block 560).

Figure 6:
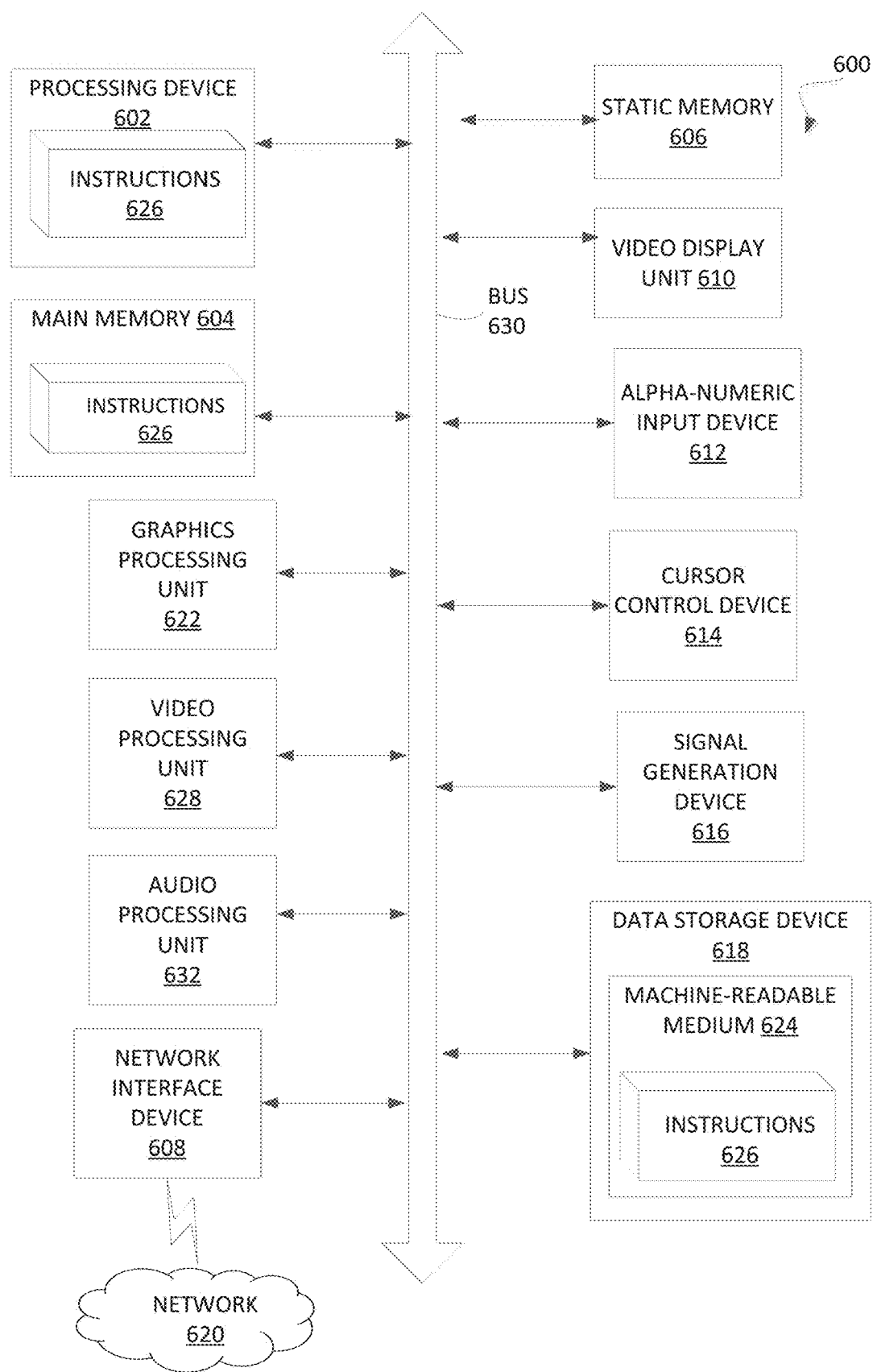
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to a multiplicative blinding component (e.g., multiplicative blinding component 111 of FIG. 1 or multiplicative blinding component 300 of FIG. 3). While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs. EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving a value corresponding to an input for a cryptographic operation;
   blinding, by a processor of an integrated circuit, the value by multiplying the value based on an exponentiation of a random number raised to an exponent value that is associated with a public key;
   receiving a second exponent value from a private key that corresponds to the public key;
   decrementing the second exponent value from the private key to generate a decremented private key exponent value; and
   performing, by the processor of the integrated circuit, the cryptographic operation based on the blinded value and the decremented private key exponent value, wherein the cryptographic operation corresponds to an encryption operation or a decryption operation.

2. The method of claim 1, wherein the public key comprises the exponent value and a modulus value.

3. The method of claim 2, wherein the blinding of the value by multiplying the value based on the exponentiation comprises:
   performing a modulo operation corresponding to the random number raised to the exponent value modulo the modulus value of the public key to generate an intermediate value; and
   multiplying the value with the intermediate value to generate the blinded value.

4. The method of claim 3, wherein the performing of the cryptographic operation based on the blinded value and the decremented private key exponent value further comprises:
   performing an exponentiation of the blinded value raised to the decremented private key exponent value to generate a second intermediate value.

5. The method of claim 4, wherein the performing of the cryptographic operation based on the blinded value and the decremented private key exponent value further comprises:
   decrementing the exponent value of the public key to generate a decremented public key exponent value; and
   performing an exponentiation of the second intermediate value raised to the decremented public key exponent value.

6. The method of claim 1, wherein the cryptographic operation corresponds to an RSA cryptographic operation, and wherein the blinding of the value is associated with reducing susceptibility of a Differential Power Analysis (DPA) leak of an exponent value of a private key that is mathematically linked to the public key.

7. The method of claim 1, wherein the cryptographic operation corresponds to an RSA cryptographic operation, and wherein the blinding of the value is associated with reducing information present in a result of the RSA cryptographic operation after a fault attack such that there is no information mathematically linked to a private key in the result.

8. A system comprising:
   a memory; and
   a processor of an integrated circuit operatively coupled with the memory and to:
      receive an input for a cryptographic operation;
      generate a random number;
      perform an exponentiation operation corresponding to the random number raised to an exponent value of a public key that is associated with the cryptographic operation;
      receive a second exponent value from a private key that corresponds to the public key;
      decrement the second exponent value from the private key to generate a decremented private key exponent value;
      perform a multiplication operation with the random number raised to the exponent value and the input to generate a first value; and
      perform the cryptographic operation based on the first value and the decremented private key exponent value, wherein the cryptographic operation corresponds to a generation or a verification of a cryptographic signature.

9. The system of claim 8, wherein the public key comprises the exponent value and a modulus value.

10. The system of claim 9, the processor is further to:
    perform a modular exponentiation operation based on the first value raised to an exponent value of the decremented private key exponent value to generate a second value, wherein the cryptographic operation is further based on the second value.

11. The system of claim 10, wherein the modular exponentiation operation is based on the Chinese remainder theorem.

12. The system of claim 10, the processor is further to:
    decrement the exponent value of the public key; and
    perform another exponentiation operation corresponding to the random number raised to an exponent value of the decremented exponent value of the public key to generate a third value.

13. The system of claim 12, the processor is further to:
    perform another multiplication operation based on the second value and the third value modulo the modulus value to generate a final value, wherein the cryptographic operation is further based on the final value.

14. The system of claim 9, wherein the cryptographic operation corresponds to an RSA cryptographic operation, and wherein the exponentiation operation and the multiplication operation are associated with reducing susceptibility of a Differential Power Analysis (DPA) leak of an exponent value of a private key that is mathematically linked to the public key.

15. A non-transitory computer readable medium including data that, when accessed by a processor of an integrated circuit, cause the processor to perform operations comprising:
- receiving a value corresponding to an input for a cryptographic operation;
- blinding the value by multiplying the value based on an exponentiation of a random number raised to an exponent value that is associated with a public key;
- receiving a second exponent value from a private key that corresponds to the public key;
- decrementing the second exponent value from the private key to generate a decremented private key exponent value; and
- performing the cryptographic operation based on the blinded value and the decremented private key exponent value, wherein the cryptographic operation corresponds to an encryption operation or a decryption operation.

16. The non-transitory computer readable medium of claim 15, wherein the public key comprises the exponent value and a modulus value.

17. The non-transitory computer readable medium of claim 16, wherein the blinding of the value by multiplying the value based on the exponentiation comprises:
- performing a modulo operation corresponding to the random number raised to the exponent value modulo the modulus value of the public key to generate an intermediate value; and
- multiplying the value with the intermediate value to generate the blinded value.

18. The non-transitory computer readable medium of claim 17, wherein the performing of the cryptographic operation based on the blinded value and the decremented private key exponent value further comprises:
- performing an exponentiation of the blinded value raised to the decremented private key exponent value to generate a second intermediate value.

19. The non-transitory computer readable medium of claim 18, wherein the performing of the cryptographic operation based on the blinded value and the decremented private key exponent value further comprises:
- decrementing the exponent value of the public key to generate a decremented public key exponent value; and
- performing an exponentiation of the second intermediate value raised to the decremented public key exponent value.

* * * * *